(12) United States Patent
Kim

(10) Patent No.: US 8,417,420 B2
(45) Date of Patent: Apr. 9, 2013

(54) COOPERATIVE CONTROL APPARATUS OF MOTOR DRIVEN POWER STEERING APPARATUS FOR SMART PARKING ASSISTANT SYSTEM

(75) Inventor: Jeong Ku Kim, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/441,542

(22) Filed: Apr. 6, 2012

(65) Prior Publication Data

US 2012/0265404 A1    Oct. 18, 2012

(30) Foreign Application Priority Data

Apr. 14, 2011 (KR) .................. 10-2011-0034809

(51) Int. Cl.
*G05B 13/02* (2006.01)
(52) U.S. Cl.
USPC ................. 701/43; 701/41; 701/42

(58) Field of Classification Search .............. 701/41, 701/42, 43
See application file for complete search history.

(56) References Cited

U.S. PATENT DOCUMENTS

2008/0051959 A1*   2/2008   Ishihara et al. ............ 701/41

* cited by examiner

*Primary Examiner* — Mary Cheung
*Assistant Examiner* — Fredrick Brushaber
(74) *Attorney, Agent, or Firm* — Saliwanchik, Lloyd & Eisenschenk

(57) ABSTRACT

The present invention relates to a cooperative control apparatus of a motor driven power steering apparatus for a smart parking assistant system (SPAS). The cooperative control apparatus may relieve excessive response of the motor driven power steering apparatus even through an excessive required steering angle is inputted from the SPAS, prevent damage of the motor driven power steering apparatus by controlling the motor driven power steering apparatus through a motor angular speed, reduce vibration, and improve steering performance with high control precision regardless of external disturbance.

2 Claims, 2 Drawing Sheets

COOPERATIVE CONTROL APPARATUS OF MOTOR DRIVEN POWER STEERING APPARATUS FOR SMART PARKING ASSISTANT SYSTEM

CROSS-REFERENCES TO RELATED APPLICATION

This application claims the benefit under 35 U.S.C. 119 to Korean Patent Application No. 10-2011-0034809, filed Apr. 14, 2011, which is hereby incorporated by reference in its entirety.

BACKGROUND

Exemplary embodiments of the present invention relate to a cooperative control apparatus of a motor driven power steering apparatus for a smart parking assistant system (SPAS), and more particularly, to a cooperative control apparatus of a motor driven power steering apparatus for a SPAS, which prevents damage of the motor driven power steering apparatus by relieving response of the motor driven power steering apparatus and enables a driver to steer a vehicle while reducing vibration, even though an excessive required steering angle is inputted from the SPAS.

In general, a steering system applied to a vehicle refers to a system which enables a driver to lightly and quickly steer the vehicle by reducing a control force using an electronic control unit (ECU) according to the speed of the vehicle. The steering system is divided into an electronic control power steering system and a motor driven power steering (MDPS) system. The electronic control power steering system is constructed by adding an electronic control valve for controlling oil pressure to a hydraulic power steering apparatus using oil pressure of an existing hydraulic oil pump, and controls an assist amount. The MDPS system is driven by a motor and controls an assist amount.

Furthermore, there is a SPAS for solving a problem which may occur when a driver has difficulties in parking his/her vehicle in a parking space.

Here, the SPAS searches for a parking space using a camera, and checks whether there is an empty parking space or not. Then, when there is an empty parking space, the SPAS detects the corners of a parking line, acquires the coordinates of the corners using a distance sensor, compares the size of the parking space with that of a vehicle, and then determines whether the vehicle can be parked in the parking space or not. When determining that the vehicle can be parked in the parking space, the SPAS determines the shape of the parking line, and sets the parking direction of the vehicle according to the shape of the parking line. Then, the SPAS calculates a parking track based on the direction of the vehicle and the current position of the vehicle, and automatically parks the vehicle according to the parking track.

The above-described technology indicates a related art of the technical field to which the present invention pertains, and does not indicate a prior art.

In order for the SPAS to perform automatic parking using a motor driven power steering apparatus, a cooperative control apparatus converts a required steering angle of the SPAS into a steering angle and a steering angular speed of the motor driven power steering apparatus, and controls the vehicle while checking the control state. Accordingly, as the control state is checked while steering for automatic parking is performed, it is possible to prevent a malfunction.

However, when an excessive required steering angle is transmitted to the motor driven power steering apparatus from the SPAS, the motor driven power steering apparatus excessively responds. When such a state continuously occurs, serious damage may be applied to the motor driven power steering apparatus.

Furthermore, when the motor driven power steering apparatus is rapidly varied by an external input from the SPAS, a driver may feel a sense of difference due to the vibration of the steering angular speed.

BRIEF SUMMARY

An embodiment of the present invention relates to a cooperative control apparatus of a motor driven power steering apparatus for a SPAS, which is capable of relieving excessive response of the motor driven power steering apparatus even though an excessive control target value is inputted from the SPAS, preventing damage of the motor driven power steering apparatus by controlling the motor driven power steering apparatus through a motor angular speed, reducing vibration, and improving steering performance with high control precision regardless of external disturbance.

In one embodiment, a cooperative control apparatus of a motor driven power steering apparatus for a SPAS includes: a position control unit configured to calculate a target steering angular speed at which a vehicle is to be automatically steered through a wheel steering angle inputted from a steering angle sensor and a required steering angle inputted from the SPAS; a limit value setting unit configured to determine whether or not the required steering angle inputted from the SPAS is an excessive required value and decide an excessive target limit setting value for reducing the target steering angular speed; a target angular speed setting unit configured to calculate a final target steering angular speed through the target steering angular speed calculated by the position control unit and the excessive target limit setting value set by the limit value setting unit, and convert the final target steering angular speed into a final target motor angular speed through a converter which converts the final target steering angular speed into the final target motor angular speed by applying a reduction ratio to the final target steering angular speed; and a motor angular speed control unit configured to calculate an angular speed control value for controlling a motor through the final target motor angular speed inputted from the target angular speed setting unit and the motor angular speed inputted from the motor angular sensor, and output the calculated angular speed control value to the motor driven power steering apparatus.

The limit value setting unit may calculate a required steering angle acceleration according to an input cycle of the required steering angle inputted from the SPAS, compare the required steering angle acceleration with a preset excessive required limit setting value, and decide an excessive target limit setting value for reducing the target steering angular speed.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION

Figure 1:
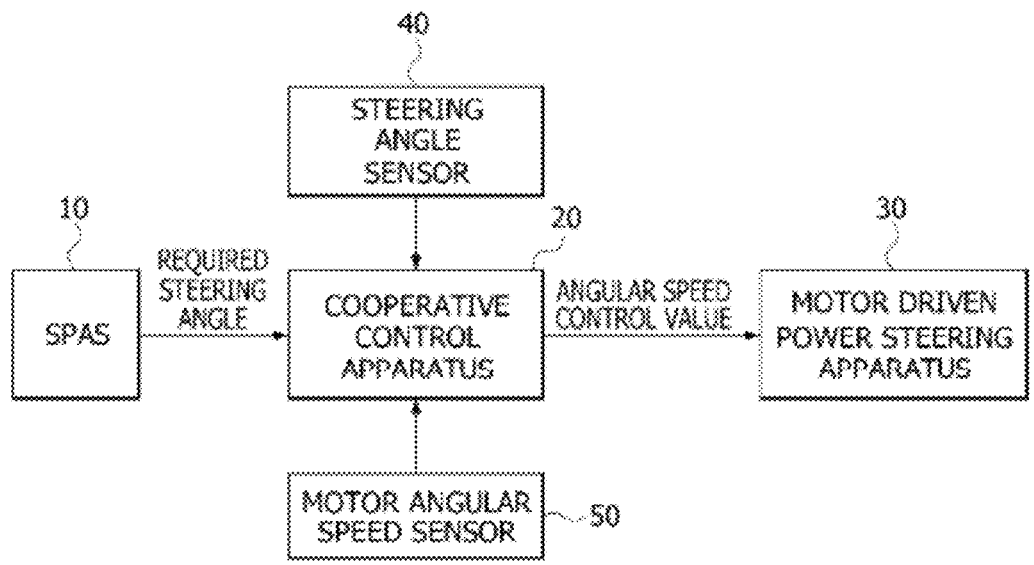
FIG. 1 is a block configuration diagram illustrating a cooperative control apparatus of a motor driven power steering apparatus for a SPAS in accordance with an embodiment of the present invention.

Hereinafter, a cooperative control apparatus of a motor driven power steering apparatus for a SPAS in accordance with an embodiment of the present invention will be described with reference to accompanying drawings. Throughout the disclosure, like reference numerals refer to like parts throughout the various figures and embodiments of the present invention. Furthermore, terms to be described below may be defined by considering functions in the present invention, and may differ according to the intention of a user or operator or the practice. Therefore, the definitions for such terms may be given based on the entire specification.

Figure 2:
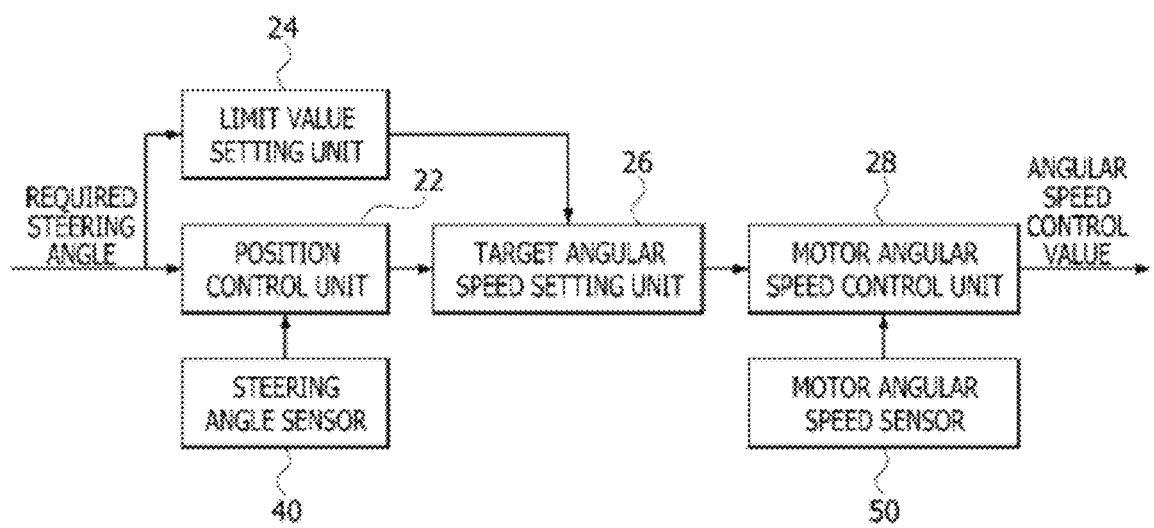
FIG. 2 is a detailed block configuration diagram of the cooperative control apparatus of a motor driven power steering apparatus for a SPAS in accordance with the embodiment of the preset invention.

FIG. 1 is a block configuration diagram illustrating a cooperative control apparatus of a motor driven power steering apparatus for a SPAS in accordance with an embodiment of the present invention. FIG. 2 is a detailed block configuration diagram of the cooperative control apparatus of a motor driven power steering apparatus for a SPAS in accordance with the embodiment of the preset invention.

Referring to FIG. 1, when a required steering angle is inputted from the SPAS 10 to automatically park a vehicle, the cooperative control apparatus 20 receives a wheel steering angle and a motor angular speed from a steering angle sensor 40 and a motor angular speed sensor 50, and outputs an angular speed control value for driving a motor (not illustrated) of the power-driven steering apparatus 30 with respect to the required steering angle, while checking a control state. Then, steering for automatic parking may be performed.

Furthermore, when the required steering angle inputted from the SPAS 10 is an excessive required value, the cooperative control apparatus 20 sets an excessive target limit setting value for reducing a target steering angular speed so as to respond the excessive required steering angle, thereby preventing damage of the motor driven power steering apparatus 30.

More specifically, referring to FIG. 2, the cooperative control apparatus of a motor driven power steering apparatus for a SPAS in accordance with the embodiment of the preset invention includes a position control unit 22, a limit value setting unit 24, a target angular speed setting unit 25, and a motor angular speed control unit 28.

The position control unit 22 calculates a target steering angular speed at which a vehicle is to be automatically steered through the wheel steering angle inputted from the steering angle sensor 40 and the required steering angle inputted from the SPAS 10.

That is, when the required steering angle is calculated and outputted to automatically park the vehicle along a parking track calculated by the SPAS 10, the position control unit 22 determines a current wheel steering angle of the vehicle through the steering angle sensor 40, calculates a target steering angle for responding to the required steering angle, and then calculates the target steering angular speed according to an input cycle of the required steering angle inputted from the SPAS 10.

As the required steering angle from the SPAS 10 is inputted at an input cycle of 20 ms through CAN communication, the target steering angular speed is calculated.

The limit value setting unit 24 determines whether the required steering angle inputted from the SPAS 10 is an excessive required value or not, and decides an excessive target limit setting value for reducing the target steering angular speed.

That is, as the required steering angle is inputted at an input cycle of 20 ms through CAN communication, the limit value setting unit 24 calculates a required steering angular speed with respect to the required steering angle, and calculates a required steering angle acceleration using the required steering angular speed. Then, when the required steering angle acceleration exceeds an excessive required limit setting value, the limit value setting unit 24 determines the required steering angle to be an excessive required value.

When the required steering angle is determined to be an excessive required value, the limit value setting unit 24 decides an excessive target limit setting value for reducing the target steering angular speed.

For example, when the required steering angle acceleration is requested in a square wave shape, the limit value setting unit 24 decides the excessive target limit setting value such that the required steering angle acceleration is exponentially changed.

At this time, the excessive target limit setting value may be decided by a table which is preset to correspond to the required steering angle acceleration.

The target angular speed setting unit 26 calculates a final target steering angular speed through the target steering angular speed calculated by the position control unit 22 and the excessive target limit setting value set by the limit value setting unit 24, and converts the final target steering angular speed into a final target motor angular speed.

At this time, the target angular speed setting unit 26 includes a converter (not illustrated) for converting the final target steering angular speed into the final target motor angular speed by applying a reduction ratio.

As such, when the steering angle required by the SPAS 10 is excessive, the required steering angle is controlled to the final target steering angle speed calculated by reducing the target steering angular speed through the excessive target limit setting value, which makes it possible to prevent excessive response of the motor driven power steering apparatus 30.

The motor angular speed control unit 28 calculates an angular speed control value for controlling a motor through the final target motor angular speed inputted from the target angular speed setting unit 26 and the motor angular speed inputted from the motor angular speed sensor 50, and outputs the calculated angular speed control value to the motor driven power steering apparatus 30.

By controlling the motor angular speed of the motor which is actually controlled by the motor driven power steering apparatus 30, it is possible to improve the precision of motor control regardless of an external disturbance such as a friction or load of a tire.

In accordance with the embodiment of the present invention, when the required steering angle outputted from the SPAS 10 is determined to be an excessive required value, the cooperative control apparatus of the motor driven power steering apparatus for the SPAS may calculate the final target steering angular speed limited by the excessive target limit setting value, thereby preventing excessive response of the motor driven power steering apparatus 30. Furthermore, the cooperative control apparatus may control the motor angular speed, thereby improving the precision as much as the reduction ratio with respect to the steering angle.

Figure 3:
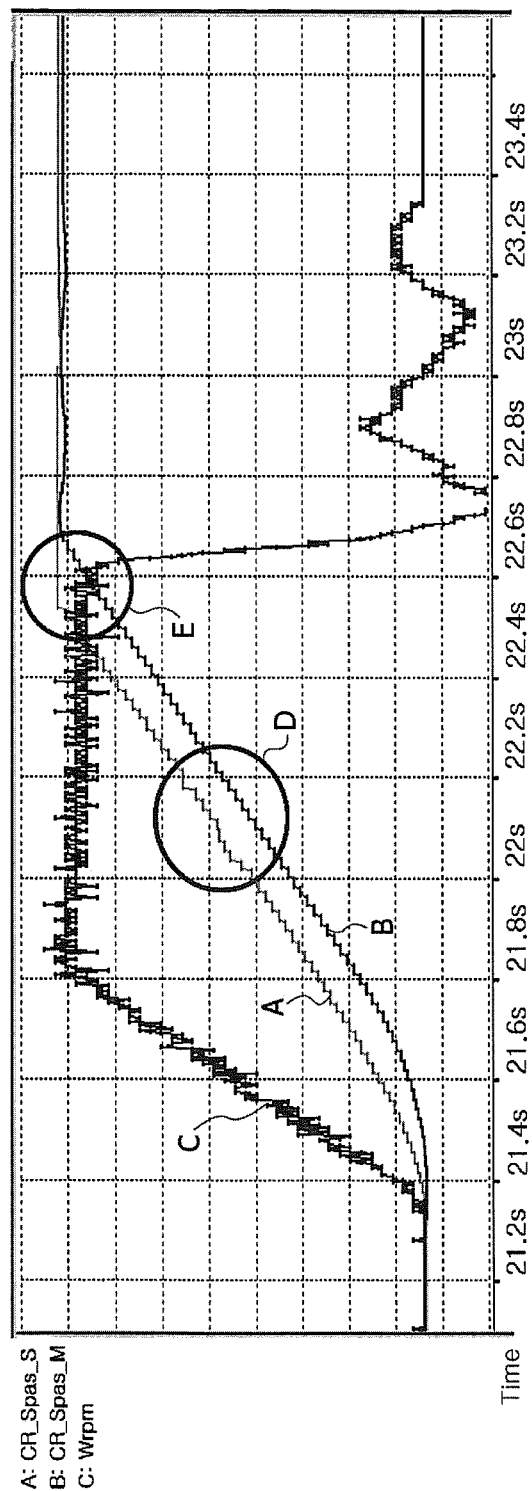
FIG. 3 is a graph showing angular speed change by the cooperative control apparatus of the motor driven power steering apparatus for the SPAS in accordance with the embodiment of the present invention.

FIG. 3 is a graph showing angular speed change by the cooperative control apparatus of the motor driven power steering apparatus for the SPAS in accordance with the embodiment of the present invention. FIG. 3 shows a required steering angle A of the SPAS 10, a following angle B of the steering wheel, and an angular speed C of the motor.

Referring to FIG. 3, it can be seen that, although the required steering angle A is excessively inputted as in a period D, the required steering angle A follows the following angle B of the steering wheel with a constant slope, when the cooperative control apparatus of the motor driven power steering apparatus for the SPAS is applied. Furthermore, it can be seen that the angular speed C of the motor is maintained constantly without a large change.

Furthermore, when the required steering angle rapidly changes from 500 deg/s to 0 deg/s as in a period E, the required steering angle acceleration becomes 25000 deg/s$^2$ in case where it is calculated as (500 deg/s)/20 ms. Therefore, when such an excessive required value is inputted, the final target steering angular speed is limited and outputted as a maximum output value of 500 deg/s. Furthermore, excessive response does not occur, and the final target steering angular speed approaches a target position.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A cooperative control apparatus of a motor driven power steering apparatus for a smart parking assistant system (SPAS), comprising:
    a position control unit configured to calculate a target steering angular speed at which a vehicle is to be automatically steered through a wheel steering angle inputted from a steering angle sensor and a required steering angle inputted from the SPAS;
    a limit value setting unit configured to determine whether or not the required steering angle directly inputted from the SPAS is an excessive required value and decide an excessive target limit setting value for reducing the target steering angular speed, wherein the required steering angle is calculated by the SPAS;
    a target angular speed setting unit configured to calculate a final target steering angular speed through the target steering angular speed calculated by the position control unit and the excessive target limit setting value set by the limit value setting unit, and convert the final target steering angular speed into a final target motor angular speed through a converter which converts the final target steering angular speed into the final target motor angular speed by applying a reduction ratio to the final target steering angular speed; and
    a motor angular speed control unit configured to calculate an angular speed control value for controlling a motor through the final target motor angular speed inputted from the target angular speed setting unit and the motor angular speed inputted from the motor angular sensor, and output the calculated angular speed control value to the motor driven power steering apparatus.

2. The cooperative control apparatus of claim 1, wherein the limit value setting unit calculates a required steering angle acceleration according to an input cycle of the required steering angle inputted from the SPAS, compares the required steering angle acceleration with a preset excessive required limit setting value, and decides an excessive target limit setting value for reducing the target steering angular speed.

* * * * *